…

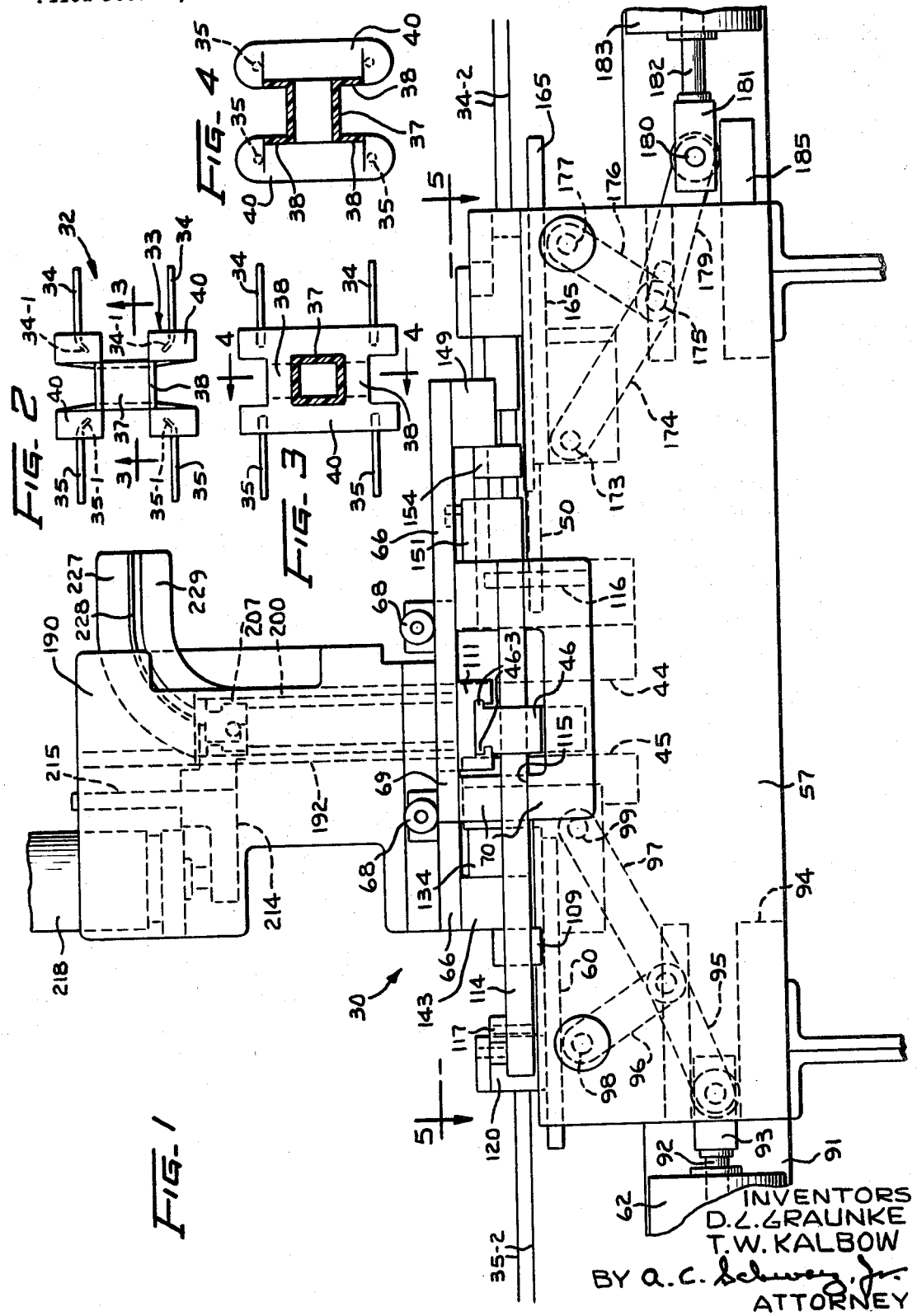

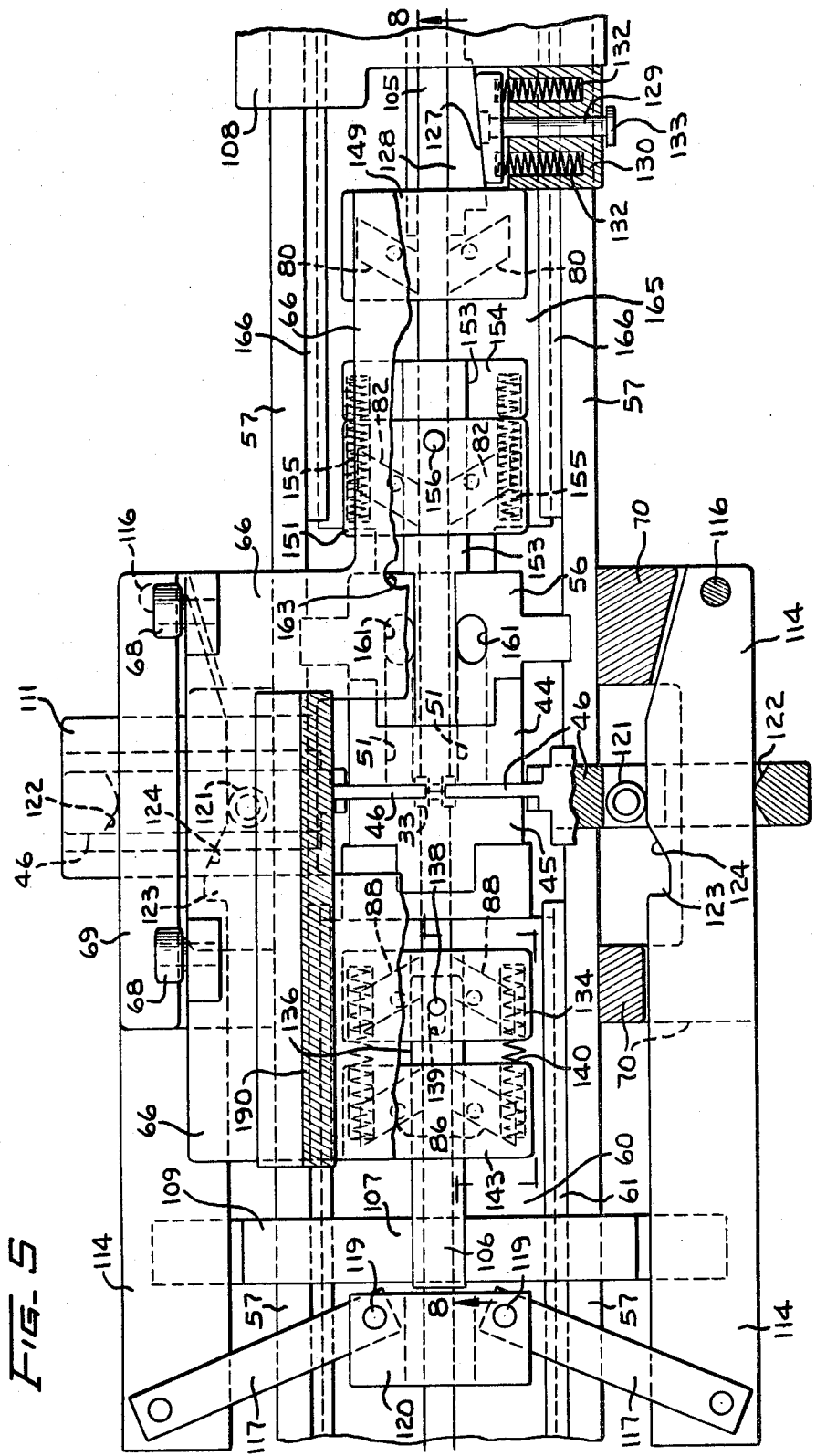

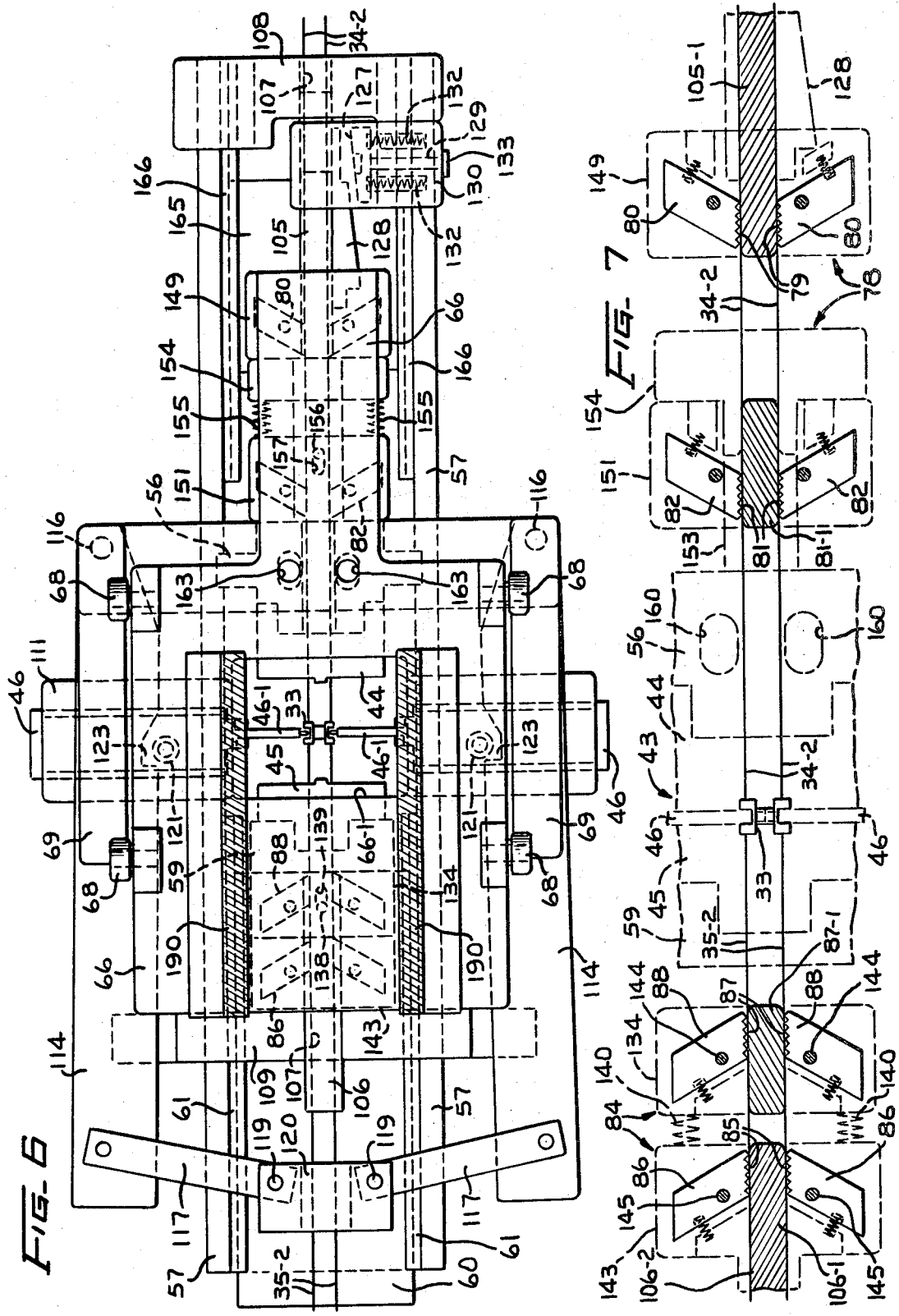

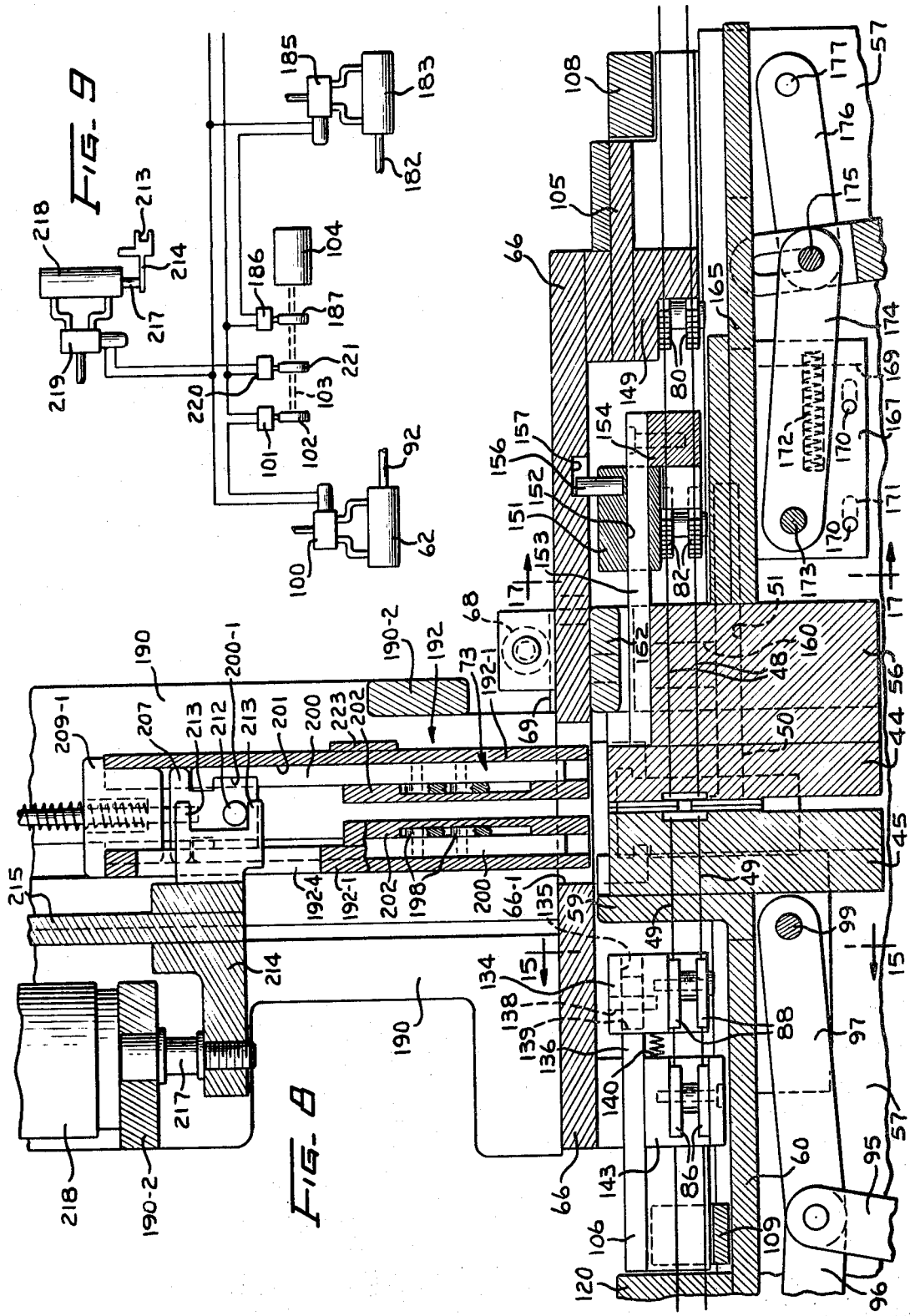

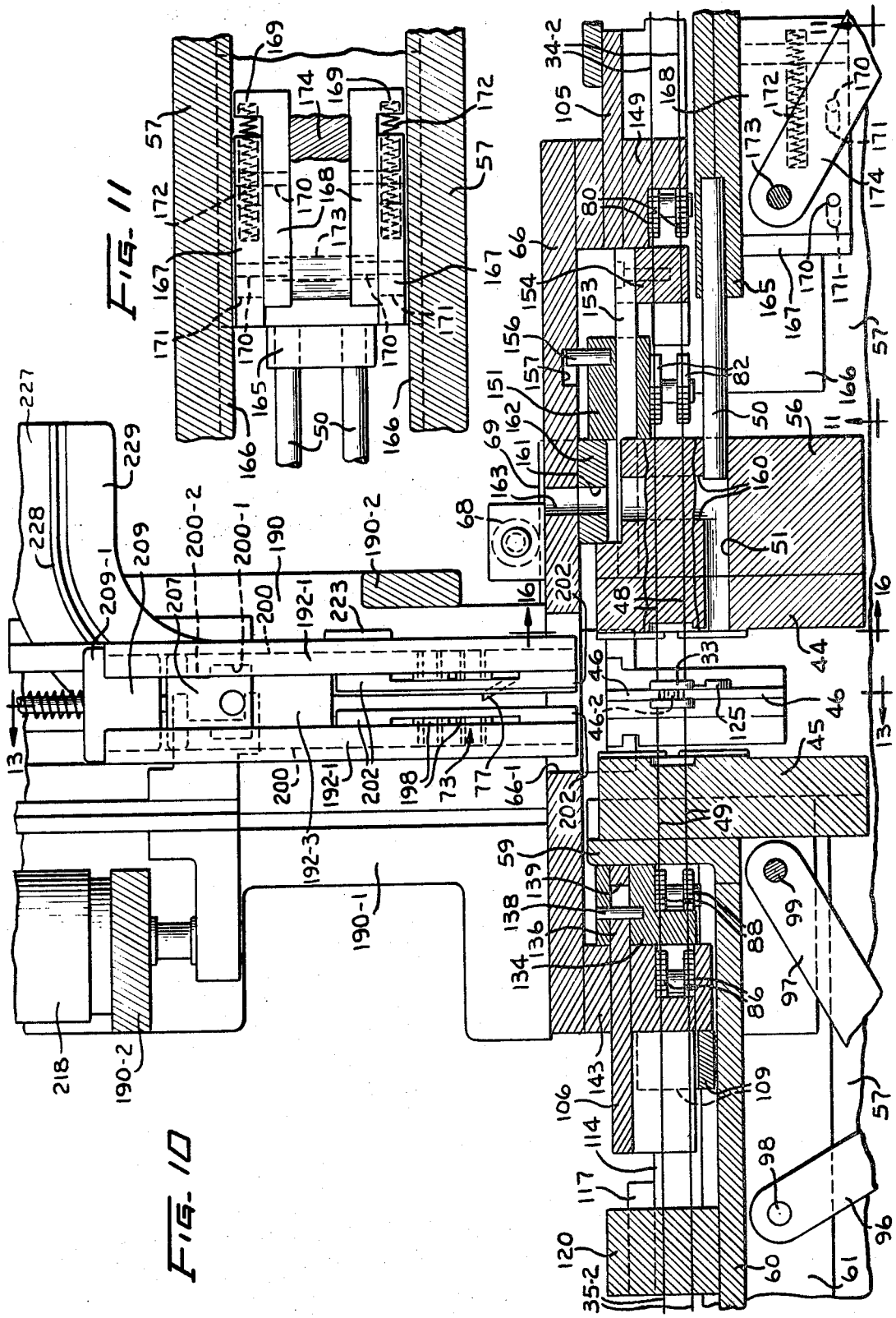

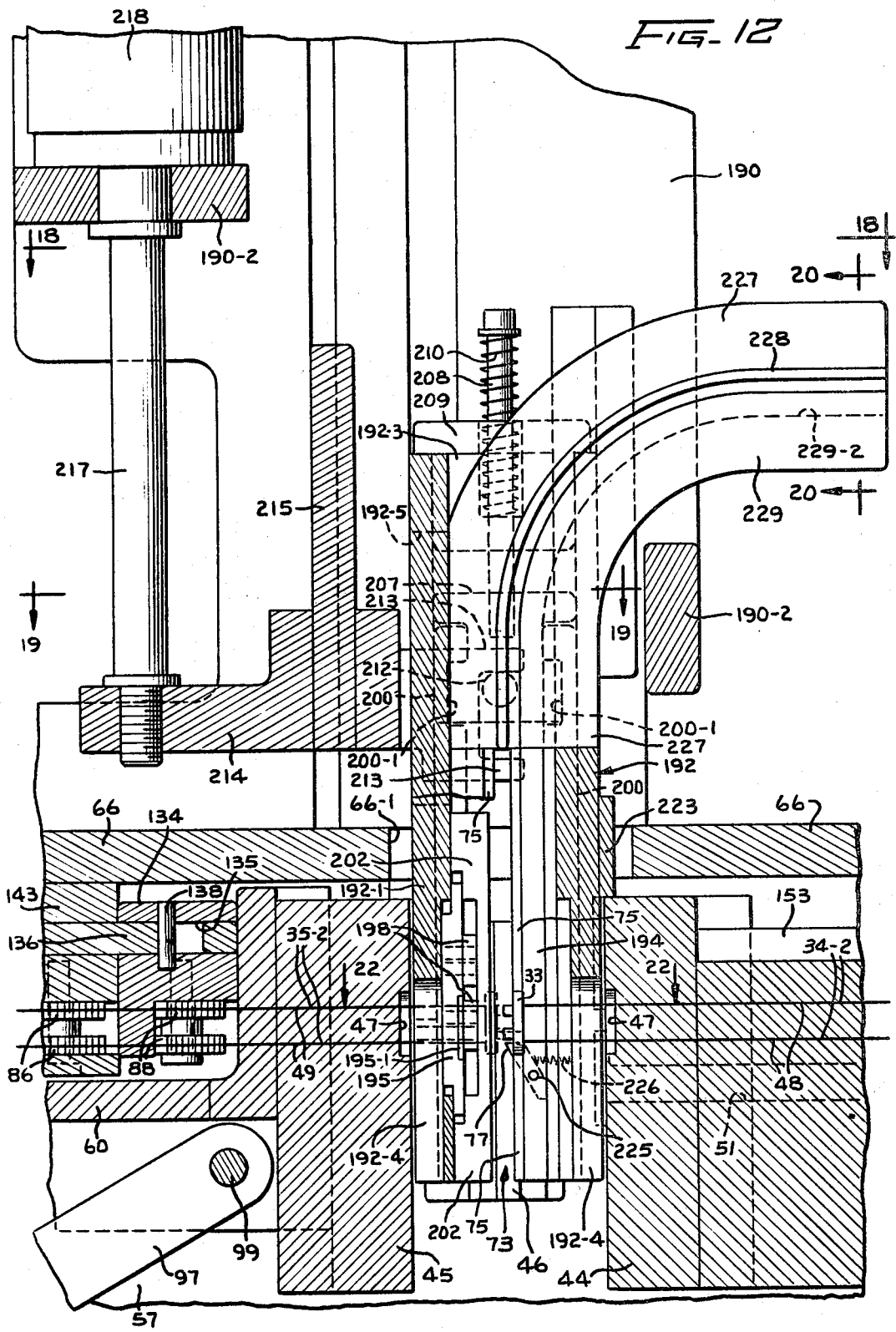

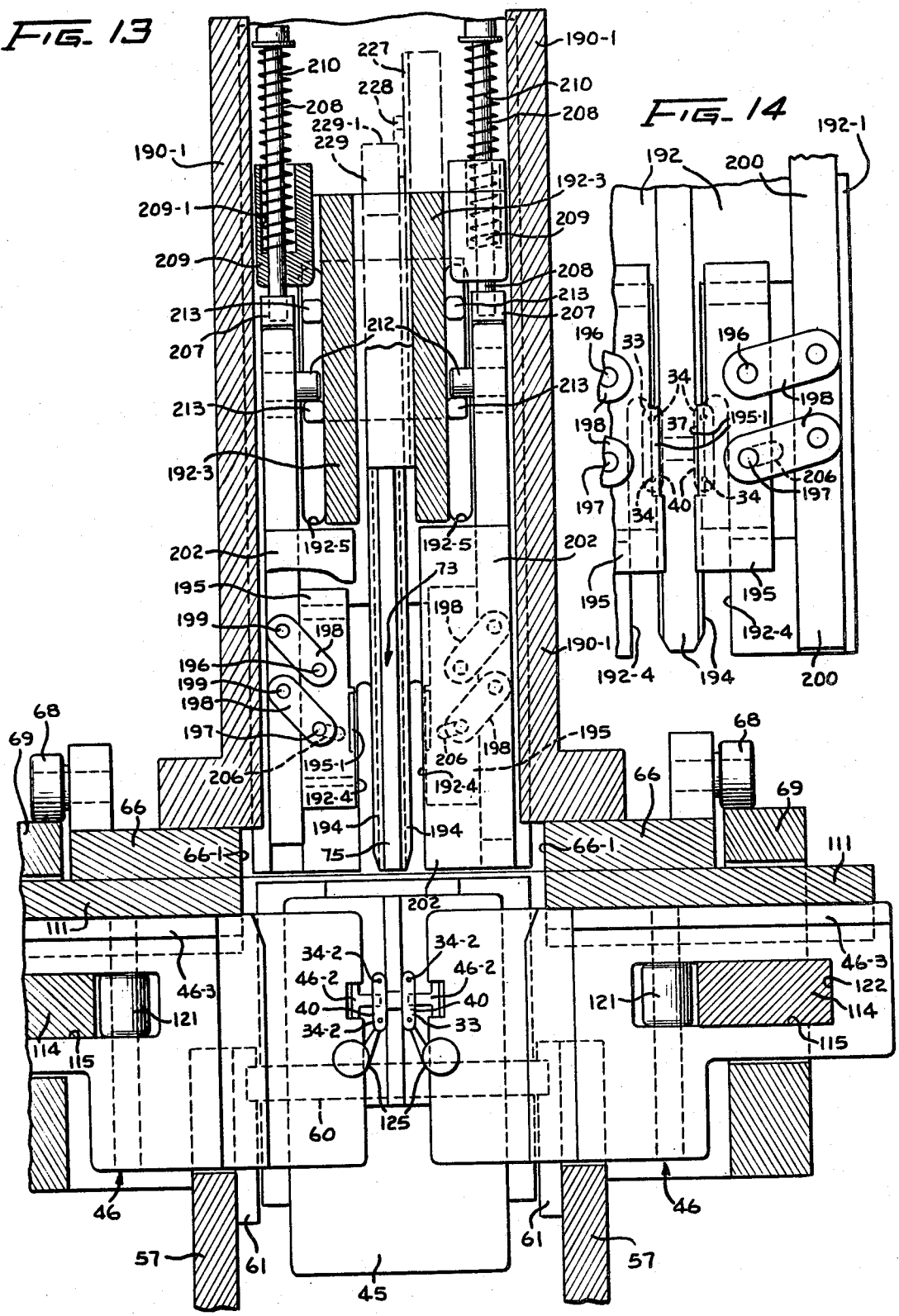

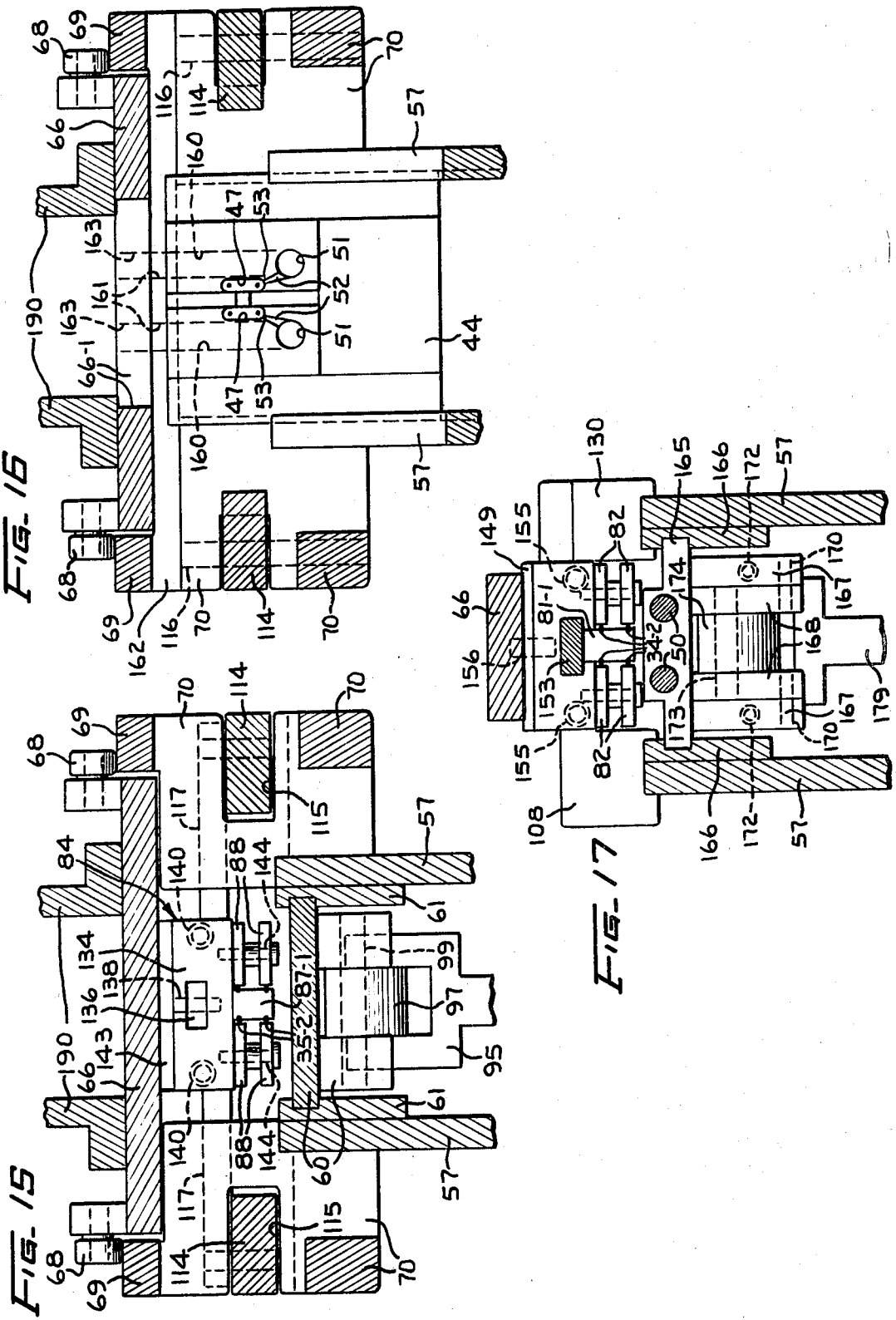

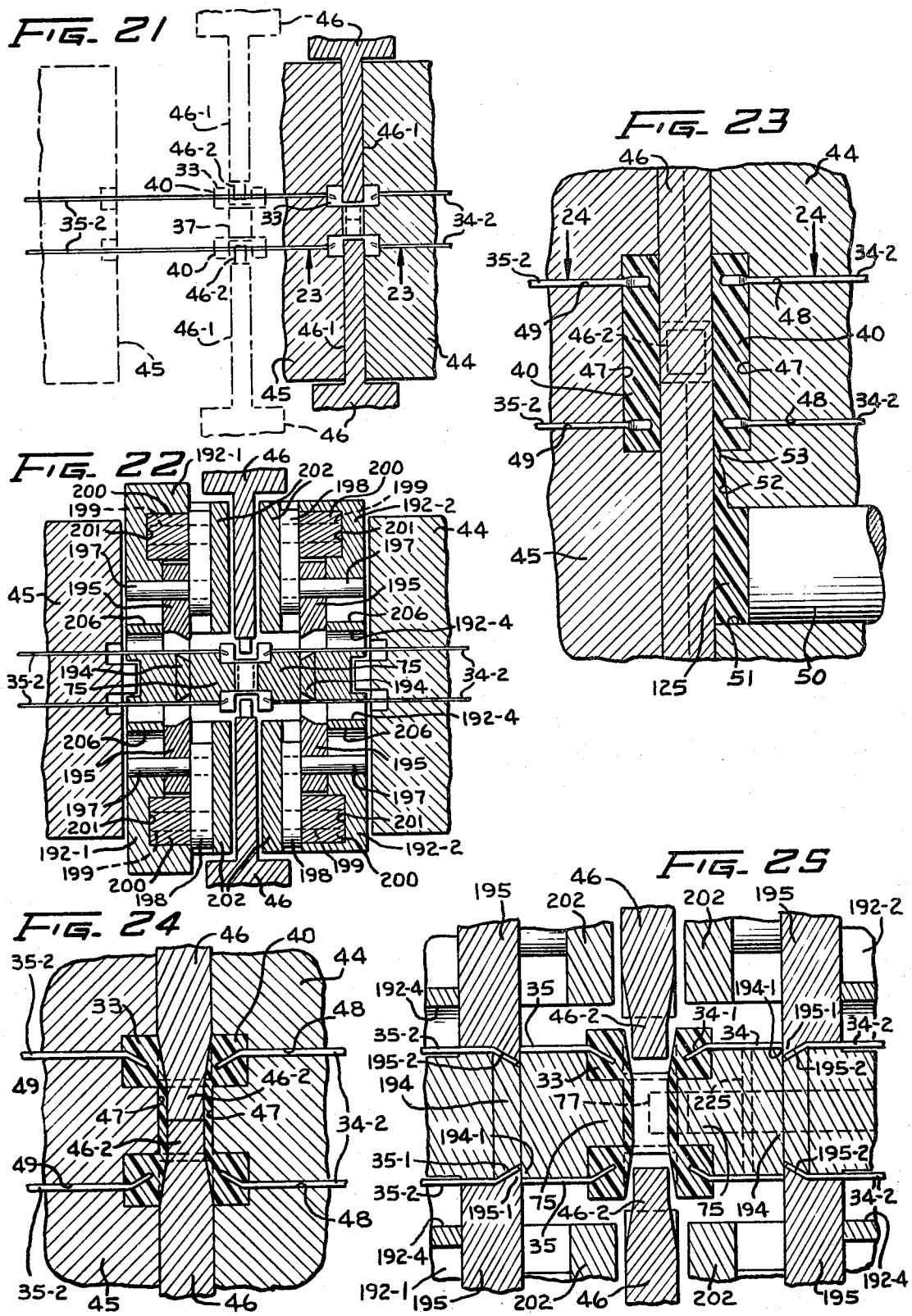

United States Patent Office 3,390,428
Patented July 2, 1968

3,390,428
APPARATUS FOR FABRICATING COIL SUPPORTING BOBBINS WITH TERMINALS ATTACHED THERETO
Delbert C. Graunke, Lyons, and Theodore W. Kalbow, Berwyn, Ill., assignors to Western Electric Company, Incorporated, New York, N.Y., a corporation of New York
Filed Dec. 23, 1965, Ser. No. 515,958
12 Claims. (Cl. 18—5)

ABSTRACT OF THE DISCLOSURE

An apparatus for molding a plastic article around the ends of terminal wires extending into the mold cavity. When the molding die elements separate, they leave the molded article suspended between them. An ejecting means then slips over the molded article advancing prior-molded articles within the ejector means and subsequently latching the instant molded article against retrogression. Cutters then sever the terminal wires between the article and the molding die elements, and the ejector means retracts from the mold cavity carrying the molded article with it. Linear feeding means then advance the terminal wires, and the mold cavity closes to await injection of the next batch of molding material.

---

The present invention relates to apparatus for fabricating coil supporting and terminating structures and, more particularly, to apparatus for molding coil supporting bobbins with terminals attached thereto.

An object of the present invention is to provide an apparatus for fabricating coil supporting and terminating structures.

Another object of the invention is to provide an apparatus for making dielectric coil supporting bobbins having terminals formed integral therewith.

A further object of the invention is to provide an apparatus for forming terminals and molding coil supporting bobbins around portions thereof.

An apparatus illustrating certain aspects of the invention may include a composite molding die having a stationary first die section, a second die section movable toward and away from the fixed die section, and a pair of third die sections having core portions thereof fitting between the other die sections, and an actuator for moving the second die section to and from open and closed positions. The several die sections in closed position have surfaces cooperable with one another to form a die cavity. In response to reciprocation of the second die section to and from open and closed positions first and second wire feeding mechanisms are actuated to effect the advancement of first and second wires, respectively, through prescribed distances along parallel paths through apertures in the first and the second die sections to dispose the ends of the wires in predetermined positions within the die cavity. Mechanism is then actuated for injecting molding compound into the die cavity to form a bobbin with end portions of the first and the second wires embedded therein.

Other mechanism operates in response to the movement of the second die to the open position to effect the movement of the third die sections and the bobbin with the wires attached thereto to a position between and in spaced relation to the first and the second die sections. A fire shearing and forming device is then moved to operative position between the open die sections and is then actuated to effect the shearing of the wires adjacent the bobbin to form terminals thereon and to bend and flatten the ends of the supply wires. A chute mounted for movement with the wire shearing device telescopingly receives the molded bobbin in the lower portion thereof and is provided with a pivoted pawl for retaining the bobbin after the wires have been sheared. As successive bobbins are fabricated and the wire shearing device and the chute are reciprocated in timed relation thereto, the bobbins are received successively in the lower portion of the chute and raise the other bobbins thereabove and effect the ejection of successive bobbins from the other end of the chute.

Other objects, advantages and novel aspects of the invention will become apparent upon consideration of the following detailed description, in conjunction with the accompanying drawings, in which:

FIG. 1 is a side view of the apparatus for fabricating coil supporting bobbins with terminals attached thereto;

FIG. 2 is a plan view of a bobbin with terminals attached of the type fabricated in the present apparatus;

FIG. 3 is a vertical cross-sectional view through the bobbin taken on the line 3—3 of FIG. 2;

FIG. 4 is a longitudinal cross-sectional view through the bobbin taken along the line 4—4 of FIG. 3;

FIG. 5 is a fragmentary plan sectional view of the apparatus taken along the line 5—5 of FIG. 1 with portions of the apparatus broken away and showing the die sections of the apparatus in closed position;

FIG. 6 is a fragmentary plan sectional view similar to FIG. 5 showing the die sections in open position;

FIG. 7 is a diagrammatic view of a portion of the wire feeding mechanism of the apparatus;

FIG. 8 is a vertical longitudinal section through the apparatus taken along the line 8—8 of FIG. 5 and showing the die sections in closed position;

FIG. 9 is a diagrammatic view of the actuating mechanism of the apparatus and the control therefor;

FIG. 10 is a fragmentary vertical longitudinal sectional view through the apparatus similar to FIG. 8 and showing the die sections in open position;

FIG. 11 is a horizontal sectional view looking up of a portion of the apparatus taken on the line 11—11 of FIG. 10;

FIG. 12 is an enlarged fragmentary vertical longitudinal sectional view of the apparatus showing the die sections in open position and the wire shearing mechanism in operative position in straddling relation to the wires and the bobbin;

FIG. 13 is a vertical cross-sectional view of the appaartus taken on the line 13—13 of FIG. 10 and showing the wire shearing mechanism in its normal upper position;

FIG. 14 is an enlarged vertical sectional view of a portion of the wire shearing mechanism showing a pair of the wire shearing elements in wire shearing position;

FIG. 15 is a fragmentary vertical cross-sectional view through the apparatus taken on the line 15—15 of FIG. 8;

FIG. 16 is a fragmentary vertical cross-sectional view through the apparatus taken on the line 16—16 of FIG. 10;

FIG. 17 is a fragmentary vertical cross-sectional view of the apparatus taken on the line 17—17 of FIG. 8;

Figure 18:
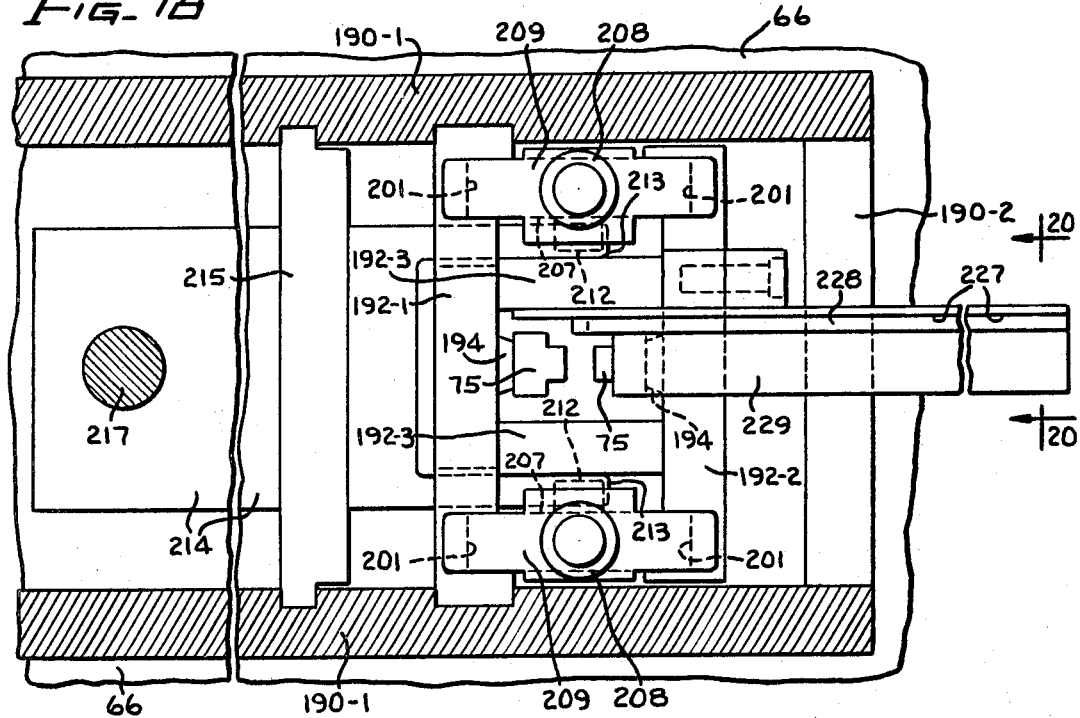
Figure 19:
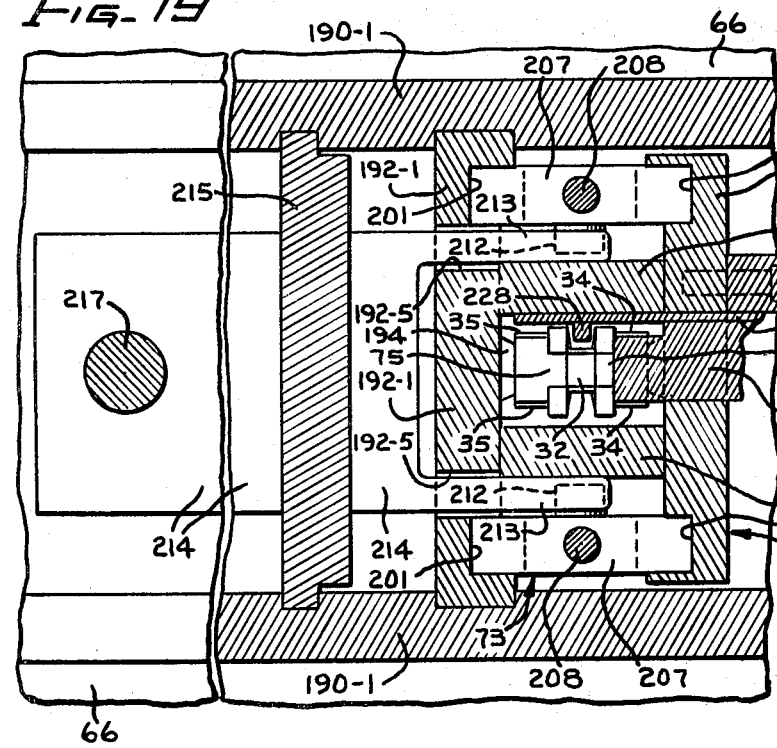
Figure 20:
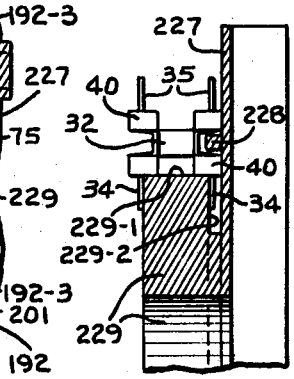

FIG. 18 and 19 are fragmentary plan sectional views of the appartus taken on the lines 18—18 and 19—19, respectively, of FIG. 12 and showing portions of the wire shearing and bobbin removing mechanism;

FIG. 20 is a vertical cross-sectional view through a portion of the apparatus taken on the lines 20—20 of FIGS. 12 and 18 and showing the guide chute for supporting the fabricated bobbin assembly;

FIG. 21 is a fragmentary plan sectional view of the apparatus showing portions of the molding die sections in full lines in closed position and in dotted lines in open position;

FIG. 22 is a fragmentary cross-sectional view of the apparatus taken on the line 22—22 of FIG. 12 and showing the die sections in open position and the wire shearing mechanism in operative position relative thereto;

FIG. 23 is an enlarged fragmentary vertical sectional view of a portion of the die sections in closed position taken on the line 23—23 of FIG. 21;

FIG. 24 is an enlarged fragmentary horizontal sectional view through the die sections in closed position taken on the line 24—24 of FIG. 23; and FIG. 25 is an enlarged fragmentary horizontal sectional view through the apparatus showing the bobbin and portions of the die sections and wire shearing and forming mechanism.

Referring to FIGS. 1 to 4 of the drawings, the apparatus 30 is designed to fabricate coil supporting and terminating structures 32, each of which comprises a bobbin 33 and two sets of terminals 34, 35 embedded in the bobbin and extending from opposite ends thereof. The bobbin 33 has a tubular hub 37 of rectangular cross section, a pair of heads 38, 38 at opposite ends thereof, and a pair of parallel terminal supporting bosses 40, 40 extending laterally outwardly from each of the heads at the marginal portions thereof for supporting the terminals 34, 35. The embedded end portions 34–1, 35–1 of the terminals are flattened and disposed obliquely to the shank of the terminals.

Generally, the apparatus comprises a composite sectional molding die 43 (FIGS. 5–8, 10, 21–24) including a stationary first die section 44, a second die section 45 movable toward and from the stationary section along a longitudinal axis to and from open and closed positions, and a pair of core sections 46, 46 having portions 46–1 and core portions 46–2 fitting between the other die sections. The several die sections are shaped so that in their closed position they form a die cavity 47 (FIG. 24) for the bobbin 33. The stationary and movable die sections 44 and 45 have sets of apertures 48 and 49, respectively, extending therethrough parallel to the longitudinal axis for guiding sets of wires 34–2, 35–2 respectively therethrough with the leading ends of the wires disposed in predetermined positions within the die cavity 47.

Mechanism including a pair of plungers 50, 50 (FIGS. 10, 16 and 17) is provided for injecting molding compound into the die cavity to form the bobbin 33 with the end portions of the wires 34, 35 embedded therein. The plungers 50, 50 are slidable in cylindrical chambers 51, 51 and serve to force the molding compound through runners 52, 52 in the first die section 44 (FIG. 16) and gates 53, 53, into the die cavity 47.

The stationary die 44 is secured to a transverse frame member 56 that extends between a pair of longitudinal side frame members 57, 57. The movable second die section 45 is affixed to the head 59 of a slide 60 which is supported for longitudinal movement in guides 61 (FIG. 15) on the side frame members 57. Reciprocal movement through a predetermined distance is imparted to the slide 60 and the movable second die section 45 by mechanism including a fluid-operated actuator 62 (FIG. 1).

A carriage 66 is mounted for horizontal longitudinal movement and supports the pair of core die sections 46, 46 for longitudinal movement therewith and for transverse movement relative thereto. The carriage is in the form of a horizontal plate and has rollers 68 which ride on guide rails 69, 69 that are mounted on brackets 70, 70 secured to the side frames 57, 57. In response to actuation of the movable second die section 45 to open position (FIGS. 6 and 10), the carriage 66 and the core die sections 46, 46 are moved in the same direction through a lesser distance to an open position and effect the movement of the bobbin 33 with the wires 34 and 35 attached thereto longitudinally to a shearing position between and in spaced relation to the fixed and movable die sections 44 and 45, respectively, as will be described in more detail hereinafter.

Wire shearing mechanism 73 (FIGS. 8, 10, 12 and 13) is supported on the carriage 66 in a normal upper position above the die sections 44, 45, 46 and in vertical alignment with the bobbin 33. During the latter portion of the movement of the second die section 45 to open position (FIG. 10) the carriage 66, the core die sections 46, the bobbin 33 with wires 34–1, 35–1 attached thereto, and the wire shearing mechanism 73 are moved thereby to open position (FIG. 10) with the bobbin and the wires below and in the path of movement of the shearin mechanism 73. The wire shearing mechanism is then lowered through an aperture 66–1 in the carriage to a shearing position (FIG. 12) between the open die sections 44, 45 and 46 and in straddling relation to the wires 34–2, 35–2 and is then actuated to effect the shearing of the wires to form the terminals 34 and 35 on the bobbin and to bend and flatten the leading end portions of the supply wires 34–1, 35–1. Thereafter, the wire-shearing mechanism 73 is retracted upwardly and the die sections 45 and 46 and the carriage 66 are returned to their closed position (FIG. 8).

As the wire shearing mechanism 73 is lowered to the shearing position, chute-forming tracks 75 mounted for movement with the shearing mechanism receive the bobbin 33 in the lower end thereof. The bobbin is retained therein by a pivoted holding pawl 77. As successive bobbins 33 are received in the chute they raise the bobbins stacked above them and effect the ejection of successive bobbins from the other end of the chute.

A first wire-feeding mechanism 78 (FIG. 7) including pairs of wire-holding jaws 79, 80, movable with the carriage 66 and pairs of wire-advancing jaws 81, 82, movable with the carriage and movable, through a prescribed distance relative to the carriage 66, is operable in response to reciprocation of the carriage to effect the advancement of the first wires 34–2, 34–2 through a predetermined distance (equal to the over-all length of the terminal 34) relative to the carriage 66 and to the first die section 44 and with the ends 34–1 of the wires disposed in predetermined positions within the mold cavity as will be described more fully hereinafter.

A second wire-feeding mechanism 84 including pairs of wire-holding jaws 85, 86 movable with the carriage 66 and pairs of wire-advancing jaws 87, 88 movable with the carriage and movable through a prescribed distance relative to the carriage 66 is operable in response to reciprocation of the carriage for advancing the second wires 35–2 through a predetermined distance (equal to the over-all length of the terminal) relative to the carriage 66 and to the movable die section 45 to position the ends of the wires 35–1, 35–1 in predetermined locations within the die cavity 47 preparatory to the injection of molding compound into the die cavity and the molding of the next bobbin around the ends of the wires.

Considering the apparatus in more detail, the actuator 62 (FIGS. 1 and 9) for the movable die section 45 is supported on auxiliary frame members 91 secured to the side frame members 57. A piston rod 92 of the actuator has a head 93 which is provided with rollers and is supported thereby for horizontal movement in a trackway formed in part by a cross frame member 94 extending between the side frame members. A pair of links 95 are connected at one end to the head and are connected at the other ends to the knee joints of two pairs of toggles links 96, 97. The toggle links 96 are pivotally connected at one end respectively to the side frames 57 for movement about fixed pivots 98, and the other toggle links 97 are pivotally connected at 99 to the slide 60.

Fluid under pressure is supplied to the actuator 62 from a supply thereof under control of a solenoid-actuated valve 100 (FIG. 9). The latter is actuated through a switch 101 which in turn is operated selectively by a cam 102 on a cam shaft 103 that is rotated by a suitable device 104. In response to operation of the actuator 62 and the piston rod 92, the toggle links 97, 98 are actuated to effect the reciprocation of the slide 60 and the movement of the second die section 45 to and from open and closed positions.

At opposite ends thereof the carriage 66 is provided with composite pilot members 105, 106, respectively, (FIGS. 5 and 6) which are slidable in guideways 107 in respective stationary guide members 108, 109 and prevent lateral displacement of the carriage. The guide members 108 and 109 extend between and are secured to the side frames 57 of the apparatus. Portions of the pilot members are in the form of bars 105–1, 106–1 which fit between the laterally spaced wires of the groups of wires 34–2 and 35–2, respectively, and are provided with grooves for guiding the wires therein. Face plates are secured to opposite sides of the bars to cover the guide grooves.

The pair of core die sections 46, 46 (FIGS. 5, 6, 13, 21) which are supported on the carriage 66 for longitudinal movement therewith and for lateral movement relative thereto have the relatively narrow vertically disposed portions 46–1 thereof disposed between the stationary and movable die sections 44 and 45, respectively, and have enlarged portions which extend outwardly therefrom and are provided with laterally extending guide flanges 46–3 (FIG. 1) at the upper portion thereof. These flanges are slidably mounted in guide members 111 on the underneath side of the carriage 66 and support the core die sections 46 for longitudinal movement with the carriage 66 and for movement transversely of the carriage and the wires 34–2, 35–2 to and from a closed position (FIGS. 5, 24) in engagement with a molded bobbin 33 and an open position (FIGS. 6, 25) in retracted relation to the bobbin.

During the longitudinal reciprocation of the carriage 66 the pair of core die sections 46 are moved transversely of the wires 34–2, 35–2 toward and away from each other by mechanism including a pair of levers 114, 114 (FIGS. 1, 5, 6, 15, 16) which extend respectively through apertures 115, 115 (FIG. 13) in the core die sections 46. Each of the levers 114 is supported at one end on one of the brackets 69 for movement about a fixed pivot 116. At the other end thereof, the lever 114 is pivotally connected to one end of a link 117, the other end of which is pivotally connected at 119 to a block 120 that is fixedly secured to the die actuating slide 60 for longitudinal movement therewith. As the slide 60 is reciprocated, the links 117 are oscillated thereby and impart movement to the levers.

The levers 114 are engageable with rollers 121 on the core die sections 46 for moving the latter toward each other, and the levers 114 are engageable with abutments 122 on the die sections for moving the core die sections away from each other. Recesses 123 on the inner edges of the levers 114 provide clearance for the rollers 121 during the movement of the core sections 46, 46 from each other to separated positions. Inclined surfaces 124 on the levers 114 serve to engage the rollers 121 and effect the camming of the core die sections 46 to substantially closed position as the core die sections are moved longitudinally with the movable second die section 45 toward the stationary die section 44. As the die section 45 approaches the closed position, the links 117 pivot the levers 114 inwardly toward each other to effect the final movement of the core die sections 46 into tightly closed relation with the stationary and movable die sections 44 and 45, respectively.

With the die sections 45, 46, 46 in open position, as shown in FIGS. 6 and 10, and in response to operation of the actuator 62 and the closing movement of the slide 60 to the right as viewed in FIG. 10, the movable second die section 45 is moved longitudinally toward the stationary die section 44 into engagement with the flat portions 46–1 of the core die sections 46 and then moves the latter therewith together with the carriage 66 to closed position (FIGS. 5 and 8).

In response to operation of the actuator 62 and the opening movement of the slide 60, to the left as viewed in FIG. 8, the slide head 59 and the second die section 45 are moved to open position (FIGS. 6 and 10). During the initial portion of the opening movement of the second die section 45, the links 117 and the levers 114 are actuated to cause the core die sections 46 to be moved away from each other transversely of the wires 34–2, 35–2 while in engagement with the first die section 44.

During this transverse movement of the core die sections 46, relative to the first die section 44, the carriage 66 is releasably held against longitudinal movement by the pressure of a brake shoe 127 against an inclined friction surface 128 (FIGS. 5 and 6) formed on one of the side plates of the pilot member 105. The friction brake shoe 127 is attached to a rod 129 which extends into an aperture of a mounting bracket 130 and supports the brake shoe 127 for limited movement transversely of the wires 34–2, 35–2. The brake shoe 127 is urged by a pair of springs 132 into engagement with the friction surface 128 of the carriage 66 and is limited in this movement by the engagement of a head 133 on the rod 129 with the bracket 130.

Mounted in the path of opening movement of the second die section 45, to the left as viewed in FIG. 8, is a floating block 134. The latter has an aperture 135 therethrough and is slidabably supported on a bar 136 that is fixed to the carriage 66 and extends into the aperture 135 thereof. The floating block 134 which is part of the second wire feed mechanism 78 (FIG. 7) is supported for longitudinal movement with the carriage 66 and for longitudinal movement relative thereto through a prescribed distance equal to the over-all length of the terminal 34 and limited by the engagement of a pin 138 on the block 134 with opposite ends of a slot 139 in the bar 136. A pair of springs 140 (FIGS. 5, 7, and 8) seated in recesses in the floating block 134 and in a fixed block 143 on the carriage 66, urge the floating block 134 to the right to a normal position as shown in FIGS. 5 and 8.

The slide head 59, after a predetermined initial movement thereof, engages the floating block 134 and moves it relative to the carriage 66 through the prescribed "terminal length" distance determined by the pin and slot connection 138, 139. Continued movement of the slide 60 and the movable die section 45 effects the release of the carriage 66 from the friction brake shoe 127 and imparts movement to the carriage 66 and advances the latter through a predetermined distance at the end of which it is stopped by the engagement of the carriage block 143 with the fixed guide member 109 (FIGS. 6 and 10).

The core die sections 46, 46 are moved longitudinally with the carriage 66 and effect the movement of the molded bobbin 33 from the stationary die section 44 to a predetermined shearing position with the bobbin disposed between the fixed and movable die sections 44 and 45. During this longitudinal movement, the core die sections 46 cooperate with the first and the second wire feeding mechanisms 78 and 84, respectively, to effect the longitudinal movement of the two groups of wires 34–2, 35–2 attached to the bobbin 33. Simultaneous with the longitudinal movement of the core die sections 46, 46 transverse movement is imparted thereto by the levers 114 to effect the withdrawal of the core portions 46–2, 46–2 from the bobbin hub 37 as the several die sections reach the open position.

*Wire feeding mechanism*

The pairs of wire advancing jaws 87, 88 of the second wire feeding mechanism 84 (FIGS. 5–8, 10 and 15) mentioned hereinabove are supported on the floating block 134, the jaws 87 being formed on opposite sides of a member 87–1 disposed between the laterally spaced wires 35–2, and the movable jaws 88 being supported for pivotal movement about pins 144 and urged by springs into engagement with the jaws 87.

The pairs of wire-holding jaws 85, 86 of the second wire-feeding mechanism 84 are mounted on the block 143 on the carriage 66 for movement therewith. The stationary jaws 85 are formed on opposite sides of a portion of the pilot bar 106–1 which is disposed between the laterally spaced second wires 35–2. The movable jaws 86 are supported for pivotal movement about pins 145 and are biased by springs toward the jaws 85 to grip the wires 35–2 therebetween.

In the first wire-feeding mechanism 78 at the other end of the carriage 66 the pair of wire holding jaws 79, 80 are mounted on a block 149 which is secured to the underneath side of the carriage 66 (FIGS. 8 and 10). Opposite sides of a portion of the pilot bar 105–1 serves as the fixed jaws 79 and cooperates with the movable jaws 80, each of which is supported on the block 148 for pivotal movement and is spring-biased toward the fixed jaw 79 to grip the wire 34–2 therebetween.

The pairs of wire-advancing jaws 81, 82 which are movable with and also relative to the carriage 66 are supported on a floating block 151 which has a horizontal aperture 152 for receiving a horizontal support bar 153 on which the block 151 is slidably mounted. The support bar 153 is fixedly secured at one end thereof to the stationary cross frame member 56. Connected to the other end of the support bar 153 is a stationary block 154 having recesses for receiving springs 155 (FIG. 6) which urge the floating block 155 and the wire feed jaws 81, 82 thereon toward the fixed first die section 44. The stationary block 154 is also provided with apertures for guiding the wires 34–2 therethrough.

A pin 156 on the floating block 151 extends into a slot 157 in the carriage 66 to connect the floating block 151 to the carriage for movement therewith and permit movement relative thereto through the prescribed "terminal length" distance. The wire-advancing jaws 81 are formed on opposite sides of a member 81–1 which is secured to the floating block and fits between the laterally spaced wires 34–2. The movable jaws 82 which are pivotally supported on the block 154 are spring urged toward the jaws 81 to grip releasably the wires 34–2 therebetween.

*Molding compound injecting mechanism*

With the die sections 45, 46, 46 in their closed positions (FIGS. 5, 7 and 8) and with the ends of the first and the second wires 34–2 and 35–2 disposed in predetermined positions within the die cavity 47 (FIG. 24) molding compound is injected into the latter from the cylindrical chambers 51 by the pair of plungers 50, 50 (FIGS. 10, 11, 16). The chambers 51 are formed in the fixed die member 44 and the die supporting frame member 56 and communicate with a pair of upwardly directed passageways 160 in the latter. In vertical alignment with the passageways 160 are apertures 161 formed in a stationary cross bar 162. Apertures 163 are formed in the carriage 66 and register with the apertures 161 and the passageways 160 when the carriage 66 is in the open position (FIG. 10). Pellets of molding material are dropped through the apertures 163, 161 and the passageways 160 into the chambers 51 during each cycle of operation by suitable dispensing mechanism (not shown) and are heated by electrical heaters (not shown).

The plungers 50 are mounted on a slide 165 that is supported for horizontal movement on guides 166 (FIG. 17) on the side frames 57. Secured to and extending downwardly from the slide 165 is a pair of laterally spaced, vertically disposed plates 167. Against the inner side of each fixed plate 167 is slidably mounted a pusher plate 168 having a laterally extending flange 169 engageable with an end portion of the slide plate 167. The pusher plates 168 are connected to the slide plates 167 by pin and slot connections 170, 171 for movement together and for limited longitudinal movement therebetween. Springs 172 supported in recesses in the slide plates 167 and the flanges 169 of the pusher plates 168 urge the slide 165 and the plungers 50 for movement relative to the pusher plates 168 toward the fixed die section 44.

The pusher plates 167 are interconnected by a pin 173 to which one end of a toggle link 174 is pivotally connected. The other end of the toggle link is pivotally connected to a pin 175 (FIGS. 1, 8) to which is also connected one end respectively of a pair of toggle links 176, the other ends of which are pivotally connected at 177 to the side frames 57 of the apparatus. The pin 175 interconnecting the toggle links 174, 176 fits in a slot at one end respectively of each of a pair of links 179, the other ends of which are connected to a rod 180. The latter is connected to a head 181 on one end of a piston rod 182 of an actuator 183. The rod 180 has rollers thereon which ride in a horizontal trackway formed in part by a cross frame member 185 extending between the side frames 57.

The actuator 183 is supported on suitable frame members secured to the side frames 57. In response to reciprocation of the piston rod 182 by the actuator 183, the toggle links 174, 176 are operated to effect the reciprocation of the slide 165 and the plungers 50 and the injection of the molding compound into the die cavity 47. The actuator 183 is operated by fluid under pressure applied to opposite ends thereof from a suitable source under control of a solenoid-actuated valve 185 (FIG. 9). The valve is controlled by a switch 186 which is actuated by a cam 187 on the cam shaft 103.

As the molding compound is ejected from the chambers 51 (FIG. 23) it engages the core die sections 46 and flows upwardly through the runners 52 in the fixed die section 44 toward the mold cavity 47 and passes through the gates 53 and into the mold cavity 47 to produce the bobbin 33.

After the molding compound has cured in the die cavity 47, the slide 60 and the movable die section 45 are actuated from closed to open position during which the levers 114 are actuated by the links 117, to move the core die sections 46 transversely of the wires 34–2, 35–2 to effect the retraction of the core portions 46–2 from the hub 37 of the bobbin 33 (FIGS. 6 and 25). As the movable second die section 45, the core die sections 46, 46 and the bobbin 33 move longitudinally and separate from the fixed die section 44, the plungers 50, are advanced a limited distance by the springs 172 to effect the ejection of the culls 125 from the chambers 51.

Thereafter, the slide head 59 for actuating the die section 45, engages the floating block 134 of the second wire-feeding mechanism 84 and moves it therewith relative to the carriage 66 and against the action of the springs 140 through the prescribed "terminal length" distance permitted by the pin and slot connection 138, 139 while the carriage 66 is yieldably held stationary by the friction brake shoe 127. During this movement of the floating block 134 relative to the carriage 66, the wire-advancing jaws 87, 88 on the block 134 slide relative to the wires 35–2 which are held against retractive movement by the gripping engagement therewith of the holding jaws 85, 86 on the carrier block 143.

After the pin 138 has moved to the other end of the slot 139 in the support bar 136 continued opening movement, to the left as viewed in FIG. 8, of the second die section 45 and the floating block 134 imparts movement to the carriage 66.

The floating block 151 of the first wire-feeding mechanism at the other end of the carriage 66 is caused to move with the carriage under the influence of the springs 155 until the floating block 151 engages and is stopped by the cross frame member 56. Thereafter, the second die section 45, the floating block 134 of the second wire-feeding mechanism, and the carriage 66 continue their movement relative to the stopped floating block 151 of the first wire-feed mechanism through the prescribed "terminal length" distance controlled by the pin and slot connection 156, 157 to the fully open position of the second die section 45 (FIGS. 6 and 10).

During this movement of the carriage 66 relative to the stopped floating block 151 of the first wire-feeding mechanism, the wires 34–2 are gripped by the holding jaws 79, 80 on the carriage block 149 and are advanced thereby through the prescribed "terminal length" distance relative to the wire-advancing jaws 81, 82 on the stopped floating block 151.

After the shearing of the wires 34–2, 35–2 adjacent the bobbin 33 and the removal of the bobbin assembly 32 from the molding die, the second die section 45 is moved from open to closed position by the actuator 62, to the right as viewed in FIG. 10. During the first portion of the return movement of the second die section 45 and the slide head 59, the floating block 134 of the second wire-feeding mechanism moves therewith through the prescribed "terminal length" distance under the influence of the springs 140 while the carriage 66 remains stationary. During this movement of the floating block 134 relative to the carriage 66, the wire-advancing jaws 87, 88 thereon serve to grip the wires 35–2 and advance them relative to the carriage 66 and to the holding jaws 85, 86 thereon through the prescribed "terminal length" distance.

As the slide head 59 and the movable second die section 45 continue their closing movement, the slide head 59 separates from the floating block 134, and at a predetermined point in its movement, the movable second die section 45 engages the portions 46–1 of the core die sections 46 and imparts longitudinal movement thereto and to the carriage 66. As the carriage 66 moves through the prescribed "terminal length" distance, the floating block 151 of the first wire-feeding mechanism is held against movement by the action of the springs 155, and the pin 156 in the floating block 151 assumes a position at the opposite end of the slot 157 in the moving carriage 66. Also, during such movement of the carriage 66 relative to the floating block 151 the first wires 34–2 are gripped by the wire-advancing jaws 81, 82 on the floating block 151 and held thereby against movement with the carriage 66 while the wire-holding jaws 79, 80 on the carriage block 149 move relative to the wires 34–2 through such prescribed "terminal length" distance. Thereafter, the second movable die section 45 and the core die sections 46, 46 and the carriage 66 continue their movements to closed position, as shown in FIGS. 5, 8 and 21 with the sets of wire feed jaws 79, 80; 81, 82; 85, 86; 87, 88 thereon in fixed relation to the carriage 66.

Thus, during each reciprocation of the die actuating slide 60 and the movable second die section 45, the first and the second wire-feeding mechanism 78 and 84, respectively, are actuated to effect the advancement of the group of first and second wires 34–2, 35–2 relative to the carriage 66 through the prescribed "terminal length" distances to dispose the ends 34–1, 35–1 of the wires 34–2, 35–2, respectively, in predetermined positions within the bobbin forming die cavity 47 of the molding die.

*Wire shearing and forming mechanism*

Mounted on and extending upwardly from the carriage 66 is a frame 190 (FIGS. 1, 8, 10, 12, 13, 18, 19) for supporting a wire shearing and forming mechanism 73 and a mechanism for stacking and removing the fabricated bobbin assemblies 32. The frame 190 comprises a pair of vertically disposed and laterally spaced parallel frame plates 190–1 which are interconnected by cross members 190–2 and support a vertically movable carrier 192 of the wire-shearing mechanism.

The carrier 192 includes a pair of vertical, laterally spaced plates 192–1, 192–2 (FIGS. 18, 19) disposed transversely of the frame plates 190–1, and interconnected by a pair of vertical, transversely disposed spacer members 192–3, 192–3. The lateral edge portions of the carrier plate 192–1 ride in vertical guideways in the frame plates 190–1 and the carrier 192 is guided thereby for vertical movement to and from a normal upper position, as shown in FIGS. 1, 8, 10 and 13, and a lower wire-shearing position, as shown in FIG. 12. Slots 192–4 in the plates 192–1, 192–2 of the vertical carrier 192 (FIGS. 12 and 13) provide clearance for the wires 34–2 and 35–2 during the movement of the carrier 192 to the lower position.

A vertically disposed shear bar 194 of a predetermined width is fixedly secured to each of the plates 192–1, 192–2 (FIGS. 12, 13, 22) of the carrier 192. Each shear bar 194, which is adapted to fit between the rows of wires 34–2, 35–2, is provided with a pair of cutting edges 194–1 (FIG. 25) formed by a wedge-shaped groove in the sides of the bar. Also mounted on each of the plates 192–1, 192–2 of the vertical carrier is a pair of movable shear blades 195 (FIGS. 13, 14, 22, 23, 25) each having a wedge-shaped edge portion forming a cutting edge 195–1 and an obliquely disposed forming surface 195–2. The cutting edges 195–1 and forming surfaces 195–2 on the shear blades 195 cooperate with the cutting edges 194–1 and obliquely disposed forming surfaces 194–2 on the shear bars 194 to effect the shearing of the wires 34–2, 35–2 to form the terminals 34, 35 on the bobbin and the bending and flattening of the sheared ends 34–1, 35–1 of the wire stock 34–2, 35–2.

Each of the shear blades 195 is pivotally connected by pins 196 and 197 to one end respectively of a pair of links 198, 198 (FIGS. 13, 14). The opposite ends of the links 198 are pivotally connected by pins 199 to actuating bars 200 which are slidable in vertical slideways 201 formed in the carrier plates 192–1, 192–2. The shear blades 195 and the links 198 are held against lateral movement from the carrier plates 192–1 and 192–2 by retaining plates 202 secured to the carrier plates.

The pivot pins 197 which interconnects the shear blades 195 with the links 198 extends into obliquely disposed slots 206 (FIGS. 14, 22) in the carrier plates 192–1, 192–2. The arrangement of the shear blades 195, the links 198, the slots 206, and the pivot pins 197 is such that in response to actuation of the bars 200 vertically through a predetermined distance the shear blades 195 are moved toward the shear bars 194 in an oblique direction to effect the shearing and forming action of the wires 34–2, 35–2 and to maintain parallelism between the cutting edges of the shear blades and the shear bar.

At the upper ends thereof the actuating bars 200 have recesses 200–1 (FIGS. 8 and 10) for receiving portions of connector members 207 therein and have laterally extending lugs 200–2 projecting into recesses in the connector members to form an interlocking connection therewith. Each of the members 207 interconnects two of the bars 200 and has opposite end portions which fit in the vertical slideways 201 in the opposed carrier plates 192–1, 192–2. A rod 208 is threadedly secured at its lower end to each of the connector members 207 and extends vertically upwardly therefrom through a counterbored aperture in a support block 209.

The latter block has portions 209–1 overlying the carrier plates 192–1, 192–2 and is supported thereby and with portions fitting into the vertical slideways 201 in the carrier plates and interlocked thereby against lateral movement relative thereto. A helical spring 210 encircling the rod 208 and interposed between the head thereof and a shoulder of the block 209 serves to urge the connector member 207 upwardly, and through the actuating bars 200 and the links 198 connected thereto, to move the shear blades 195 to retracted positions and to yieldably retain them in such positions.

A pin 212 (FIGS. 8, 13) extends horizontally from each of the connector members 207 and is positioned between and in the path of movement of a pair of horizontally directed, vertically spaced fingers 213 of a vertically movable actuating head 214 for actuating the carrier 192. The fingers 213 extend from the head 214 through vertically disposed clearance slots 192–5 (FIGS. 13, 19) in the carrier plate 192–1. The head 214 is mounted on a slide 215 which is movable vertically in guideways in the frame plates 190–1. The head is connected to one end of a piston rod 217 of a fluid-operated actuator 218 that is secured to the cross frame member 190–2.

Fluid under pressure is admitted selectively to opposite ends of the actuator 218 (FIG. 9) under control of a solenoid-operated valve 219 to effect the vertical reciprocation of the head 214, and through the fingers 213, the pins 212, the actuating bars 200, and the links 198, the actuation of the shearing blades 195 and the shearing and forming of the wires 34–2, 35–2. Actuation of the valve 219 is controlled by a switch 220 which is actuated in timed relation to the other switches 101, 186 by a cam 221 on the cam shaft 103.

After the movable second die section 45 has been actuated to open position with the bobbin 33 and the wires 34–2, 35–2 in shearing position and with the shearing mechanism 73 in vertical alignment with the bobbin and the space between the open die sections 44, 45, 46, as indicated in FIGS. 6 and 10, the switch 220 is actuated by the rotary cam 221 to effect the operation of the actuator 218 and the downward movement of the head 214. This causes the lowering of the carrier 192 and the movement of the shearing blades 195 and shearing bars 194 into straddling relation to the wires 34–2, 35–2.

A stop member 223 on a carrier plate 192–2 (FIGS. 10, 12) engages the upper surface of the fixed die section 44 and stops the downward movement of the carrier 192 in shearing position with the cutting edges of the shearing blades 195 and bars 194 on opposite sides of and in horizontal alignment with the wires 34–2, 35–2. Continued downward movement of the pusher head 214 relative to the stopped carrier 192 causes the downward movement of the actuating bars 200 and through the links 198 causes the movement of the shearing and forming blades 195 toward the shear bars 194 to effect (1) the shearing of the wires 34–2, 35–2 and the severance of the terminals 34, 35 from the wire stock, and (2) the bending obliquely and flattening of the leading ends 34–1, 35–1 of the wire stock.

On completion of the wire shearing and forming operation, the switch 220 is actuated by the cam 221 to effect the reversal of the actuator 218 and the return movement of the head 214 to the normal upper position. During such return movement of the head 214, the actuating bars 200 are moved upwardly and serve to retract the cutting blades 195 laterally from the cutting bars 194 and thereafter to raise the carrier 192 to the upper position.

It will be understood that the cams 102, 186 and 221 are designed to effect the operation of the several actuators 62, 183 and 218 in a predetermined timed relation to one another to achieve the desired automatic operation of the apparatus.

*Bobbin-removing mechanism*

The mechanism for stacking and ejecting the fabricated bobbin assemblies 31 includes the pair of vertically disposed tracks 75 which are formed on the shear bars 194 (FIGS. 12, 13, 22 and 25). The tracks 75 are adapted to fit on opposite sides of the hub 37 of the bobbin 33 and between the pairs of terminal-supporting bosses 40 respectively on opposite heads of the bobbin in response to downward movement of the carrier 192 to the shearing position (FIG. 12). The bobbin-retaining pawl 77 is pivotally supported on a pin 225 in a vertical slot in one of the bars 194 and tracks 75 and is urged by a spring 226 (FIG. 12) to a normal operative position with a portion thereof projecting from the track to engage and support the bobbin 33 during the upward movement of the carrier 192.

During the downward movement of the carrier, the pair of tracks 75 straddle the bobbin 33 and carry the holding pawl 77 downwardly besides and below the hub 37 of the bobbin where the pawl pivots outwardly to operative position with a portion thereof beneath the bobbin hub. Also during the downward movement of the carrier 192, the lower ends of one pair of the retaining plates 202 thereon engage the cull portions 125 of the molding matterial attached to the bobbin 23 and serve to break the culls from the bobbin. After the wires 34–2, 35–2 have been sheared and in response to upward movement of the carrier 192, the pawl 77 engages the hub 37 of the bobbin and raises the bobbin 33 upwardly therewith. In the course of successive molding and shearing operation, successive bobbins 33 are received in the chute formed by the tracks 75 during the downward movements of the carrier 192 and each bobbin serves to raise the bobbins stacked thereabove.

The vertical tracks 75 (FIG. 12) form only a lower portion of the chute for removing the bobbins 33. The upper portion of the chute includes a vertically disposed plate 227 which is secured to one of the spacer members 192–3 of the carrier (FIGS. 12, 18, 19) with one surface thereof positioned in close proximity to the path of travel of one pair of the terminal-supporting bosses 40 of the bobbins as they leave the vertical tracks 75. Mounted on the plate 227 is a guide rail 228 which is adapted to fit between a pair of the terminal-supporting bosses 40 on one head of the bobbin.

A second rail 229 is also mounted on the supporting plate 227 and has a surface 229–1 disposed transversely of the plate 227 and in spaced relation to the guide rail 228 and in close proximity to the path of travel of one pair of the terminal-supporting bosses 40 of the bobbin for engaging such bosses and supporting the bobbin during a portion of its travel. The rail 229 is provided with a flat surface 229–2 in spaced and parallel relation to the supporting plate 227 and in close proximity to the path of travel of one set of the wire terminals 34 extending from the bobbin 33.

As seen in FIGS. 19 and 20, the arrangement of the supporting plate 227 and the guide rails 228, 229 is such that the guide rail 228 and the surface 229–1 of the guide rail 229 form a guideway for guiding the bobbins 33 for movement along a predetermined path and the surface 229–1 of the guide rail serves to engage the terminals 34 and retain the bobbins against movement laterally from the supporting plate 227. The plate 227, guide rails 228 and 229 thereon are shaped to change the direction of movement of the bobbins from vertical to horizontal and to allow the bobbins to be ejected from the end of the chute and drop into a suitable receptacle (not shown).

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. In an apparatus of the type described, the combination of:

means for molding an article about an end portion of a wire extending therewithin;

means for introducing molding material within said molding means;

means for removing the molded article from said molding means;

means for severing the wire between the molded article and said molding means;

means for ejecting the molded article;

means for feeding wire within said molding means; and means for operating said material introducing means, said article removing means, said severing means, said ejecting means and said wire feeding means in timed relationship with respect to each other.

2. In an apparatus of the type described, the combination of:
  a molding die having a plurality of die sections mounted for relative movement therebetween to and from open and closed positions and forming a die cavity in the closed position for molding an article onto an end portion of a wire, one of said die sections having an aperture for guiding the wire into said die cavity;
  means for effecting relative movement between said die sections to and from open and closed positions and between said die sections and the article to position the article and the die sections in spaced relation to one another in open position and with the article accessible for the shearing of the wire between said one die section and the article;
  means for shearing the wire; and
  means actuated by the movement of one of said die sections to and from open and closed positions for advancing the wire and locating the end portion thereof in a predetermined position in said die cavity.

3. In an apparatus of the type described, the combination of:
  a composite die having a die cavity for molding an article therein about the end of a wire and including a first die section, and a second die section movable to and from said first die section to open and closed positions, respectively;
  means responsive to the movement of said second die section to open position for moving the article to a position between said die sections and in spaced relation thereto;
  means for shearing the wire between the article and one of said die sections; and
  wire-feeding means operated by the movement of said second die section to and from open and closed positions to effect the feeding of the wire and the positioning of the end thereof in a predetermined location within said mold cavity.

4. In an apparatus of the type described, the combination of:
  a molding die having a plurality of sections mounted for relative movement therebetween to and from open and closed positions and forming a die cavity in the closed position for molding an article onto end portions of a pair of wires, two of said die sections each having an aperture for guiding a wire into said die cavity;
  means for effecting relative movement between said die sections to and from open and closed positions and between said die sections and the article to position the article and the die sections in spaced relation to one another;
  means for shearing the wires between the article and said die sections;
  means responsive to the movement of one of said die sections to and from open and closed positions for advancing one of the wires in one direction and locating the end portion thereof in a predetermined position in said die cavity; and
  means responsive to the movement of one of said die sections to and from open and closed positions for advancing the other wire in a different direction and locating the end portion thereof in a predetermined position in said die cavity.

5. The apparatus as defined in claim 4 including the provision of:
  a carrier for supporting said wire-shearing means;
  means for actuating said carrier to effect the movement of said wire-shearing means to and from a normal retracted position in spaced relation to the wires and to said die sections and an advanced position between said open die sections and in straddling relation to the wires; and
  means responsive to the movement of said carrier to the advanced position for effecting the actuation of said shearing means.

6. The apparatus as defined in claim 5 including the provision of:
  guide means mounted on said carrier and forming an open-ended guideway for receiving and stacking successive articles therein in response to movement of said carrier successively to and from the advanced position and for guiding the articles for movement therethrough along a predetermined path; and
  means for supporting successive articles in said guideway against reverse movement therein upon severance of the wires.

7. The apparatus as defined in claim 4 including the provision of:
  a carrier mounted for movement transversely of the wires into the space between said die sections in open position for supporting said wire-shearing means;
  said wire-shearing means comprising shearing members fixedly mounted on said carrier for movement therewith to a shearing position with said shearing members disposed, respectively, on one side of the wires;
  shearing blades mounted on said carrier for movement therewith and for lateral movement thereon from normal open positions spaced from said shearing members into engagement with said shearing members respectively;
  resilient means for moving said shearing blades respectively relative to said carrier and said shearing members to open position;
  actuating means for reciprocating said shearing blades through a predetermined distance to effect the forward and return movement of said carrier to and from the shearing position and a normal retracted position; and
  means for stopping the forward movement of said carrier in a predetermined shearing position prior to the completion of the movement of said actuating means and with said shearing members and said shearing blades in straddling relation respectively to the wires so that in response to completion of the movement of said actuating means said shearing blades are actuated thereby from the open position into engagement with said shearing members to effect the shearing of the wires.

8. In an apparatus of the type described, the combination of:
  a composite molding die having a first section, a second section, and a core section between said first and said second sections and cooperating therewith to form a die cavity for molding an article about the ends of a pair of wires;
  mounting means for supporting said first die section and for supporting said second die section for longitudinal movement toward and away from said first die section to closed and open positions;
  a carriage supported on said mounting means for longitudinal movement for supporting said core section for longitudinal movement therewith and for transverse movement relative thereto;
  means for moving said second die section to and from closed and open positions;
  means responsive to the movement of said second die section to open position for effecting the movement of said carriage to a first position with the core section and the molded article disposed longitudinally between and in spaced relation to said first and said second die sections and responsive to the movement of said second die section to closed position for effecting the movement of said carriage to a second position with said core section in engagement with said first and second die sections;

means responsive to the movement of said second die section to open position for effecting the transverse movement of said core section from the article;

means for shearing the wires between the article and said first die section and between the article and said second die section;

a first wire-feeding means mounted on said carriage and operable in response to actuation of said carriage to and from said first and said second positions for advancing one of the wires in one direction and locating the end portion thereof in a predetermined position within said die cavity; and a second wire-feeding means mounted on said carriage and operable in response to movement of said carriage to and from said first and said second positions for advancing the other wire in another direction and locating the end portions thereof in a predetermined position within said die cavity.

9. An apparatus as defined in claim 8 including the provision of:

a carrier mounted on said carriage for supporting said wire-shearing means for movement transversely of said longitudinal axis into the space between said open die sections;

means for actuating said carrier to effect the movement of said wire-shearing means to and from a normal retracted position in spaced relation to the wires and to said die sections and an advanced position in straddling relation to the wires; and means responsive to the movement of said carrier to the advanced position for effecting the actuation of said shearing means and the shearing of the wires.

10. An apparatus as defined in claim 8 wherein each or said wire-feeding means is characterized by a pair of holding jaws mounted on said carriage for longitdudinal movement therewith for releasably gripping the wire and preventing reverse movement thereof relative to said carriage:

a support member mounted for longitudinal movement with said carriage and for movement relative thereto through a predetermined distance in a direction toward and away from one of said die sections;

a pair of feeding jaws mounted on said member for releasably gripping the wire and preventing reverse movement of the wire relative thereto in a direction from said one die section;

resilient means for moving said support member and said feeding jaws toward said one die section; and stationary means for stopping said support member at a predetermined position and effecting movement of said carriage and the wire relative to said support member and said feeding jaws through a predetermined distance, the arrangement being such that in response to reciprocation of said second die section to and from open and closed positions and the reciprocation of said carriage, the wire is advanced by said wire-feeding jaws a predetermined ditsance with the end of the wire in a predetermined location in said die cavity.

11. An apparatus as defined in claim 9 including the provision of:

guide means mounted on said carrier and forming an open-ended guideway for receiving and stacking successive articles in response to movement of said carrier successively to the advanced position and for guiding the article along a predetermined path from the carrier; and means for retaining the article in said guideway against reverse movement therein upon the severance of the wires.

12. An apparatus as defined in claim 9 wherein said first die section is provided with a chamber which extends therethrough adjacent said die cavity for receiving molding compound therein and is provided with an open end adapted to be closed by one face of said core die section, said first die section having a runner and a gate in one face thereof adjacent said one face of said core die section for guiding the molding compound from said chamber into said die cavity;

a ram slidable in said chamber;

means for actuating said ram through a predetermined distance to effect the ejection of molding compound from said chamber into said die cavity and the formation of an article;

resilient means operable in response to movement of said core die section longitudinally from said first die section for further advancing said ram to effect the ejection of the cull portion of the molding material from said chamber simultaneously with the movement of the article from said first die section; and means on said carrier operable in response to movement thereof to the advanced position for engageing the cull and effecting the separation thereof from the article.

References Cited
UNITED STATES PATENTS

| | | |
|---|---|---|
| 1,831,144 | 11/1931 | Shearer. |
| 2,568,771 | 9/1951 | Smith. |
| 2,720,690 | 10/1955 | Mullan et al. |
| 2,794,211 | 6/1957 | Brown et al. |
| 2,900,662 | 8/1959 | Scherry. |
| 3,009,197 | 11/1961 | Hahn. |
| 3,030,694 | 4/1962 | Kerstetter et al. |

WILBUR L. McBAY, *Primary Examiner.*